(No Model.) 2 Sheets—Sheet 1.
A. C. McCUTCHEON.
FRUIT CANNER.
No. 574,750. Patented Jan. 5, 1897.
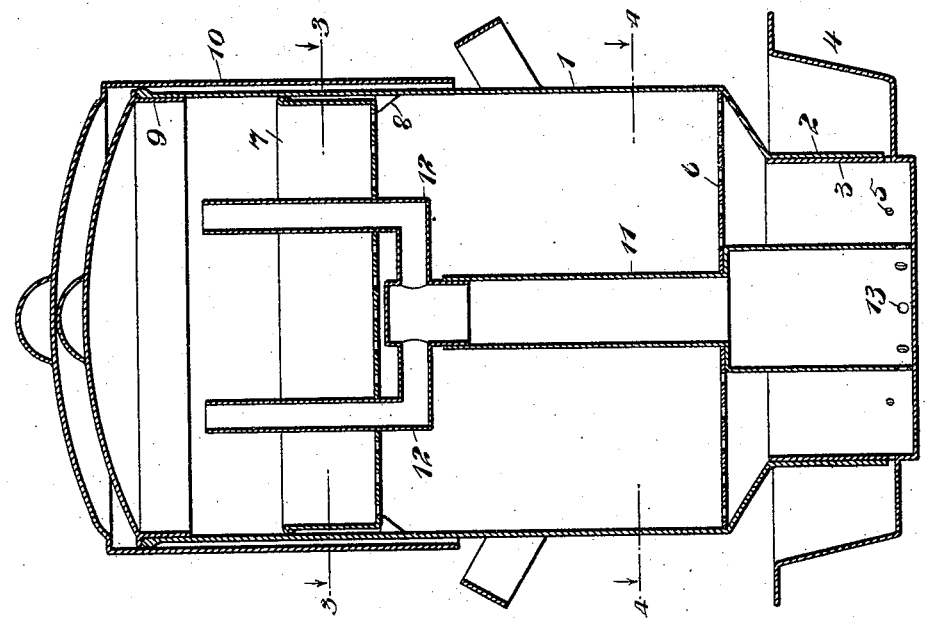
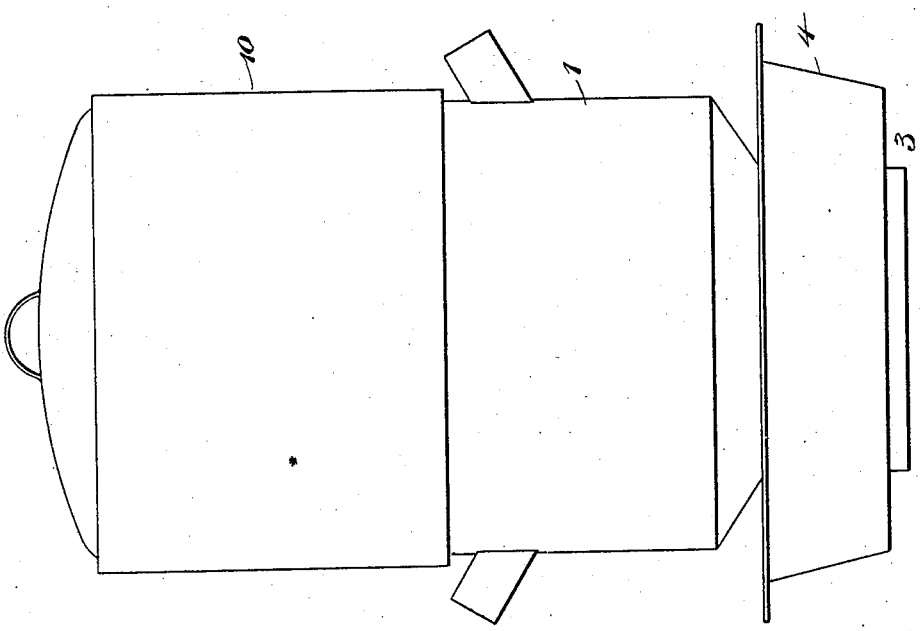
WITNESSES:
Edward Thorpe
C. R. Ferguson
INVENTOR
A. C. McCutcheon
BY
ATTORNEYS.

(No Model.)  2 Sheets—Sheet 2.

A. C. McCUTCHEON.
FRUIT CANNER.

No. 574,750. Patented Jan. 5, 1897.

WITNESSES:
Edward Thorpe
C. R. Ferguson

INVENTOR
A. C. McCutcheon
BY
ATTORNEYS.

UNITED STATES PATENT OFFICE.

ANNA C. McCUTCHEON, OF SPARTA, MICHIGAN.

FRUIT-CANNER.

SPECIFICATION forming part of Letters Patent No. 574,750, dated January 5, 1897.

Application filed August 10, 1896. Serial No. 602,325. (No model.)

*To all whom it may concern:*

Be it known that I, ANNA C. MCCUTCHEON, of Sparta, in the county of Kent and State of Michigan, have invented a new and Improved Fruit-Canner, of which the following is a full, clear, and exact description.

This invention relates to devices for steaming fruit and vegetables for preserving while in the cans; and the object is to provide a simple device wherein the material to be preserved may be quickly cooked by steam while in the cans. In the ordinary method of canning fruit the material is cooked in a stewpan and when boiling hot placed in the cans, which are subsequently sealed. This not only requires a considerable time, but it is found that the fruit is not perfectly preserved by this method. With my device the fruit is first placed in the cans and then the cans are placed in the steamer and the fruit cooked by steam. By this method I have found that the fruit retains its flavor and color much more perfectly than fruit canned in the usual manner.

I will describe a fruit-canner embodying my invention and then point out the novel features in the appended claims.

Reference is to be had to the accompanying drawings, forming a part of this specification, in which similar characters of reference indicate corresponding parts in all the views.

Figure 4:
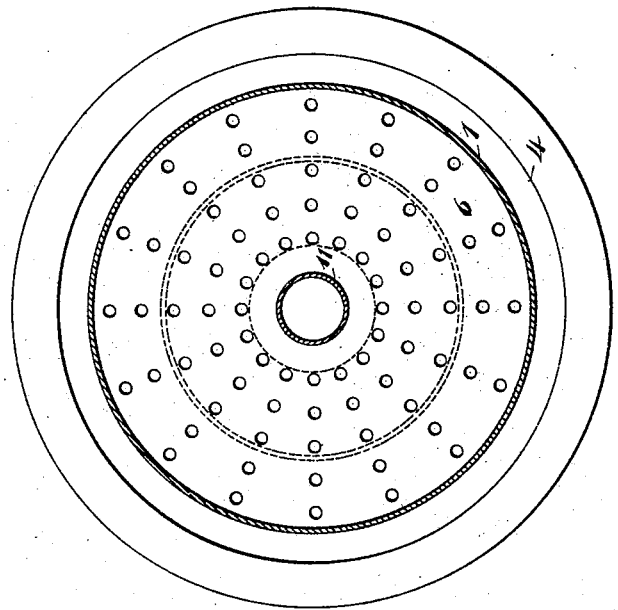
Figure 3:
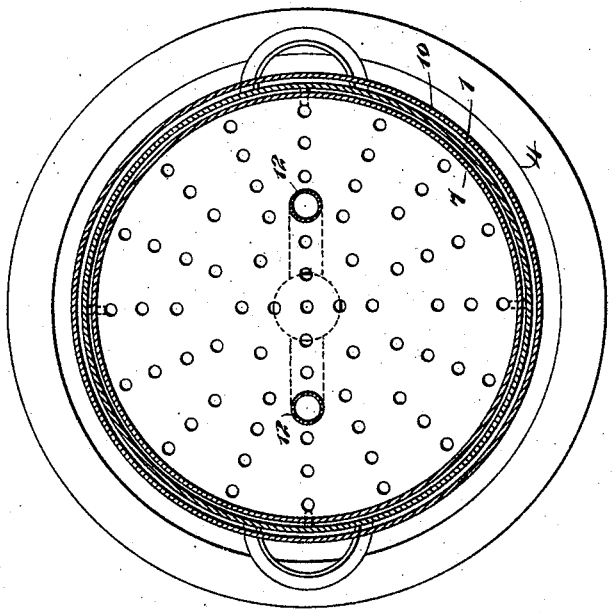

Figure 1 is a side elevation of a fruit-canner embodying my invention. Fig. 2 is a vertical section thereof. Fig. 3 is a section on the line 3 3 of Fig. 2, and Fig. 4 is a section on the line 4 4 of Fig. 2.

Referring to the drawings, 1 designates the body portion of the canner or steamer, having a reduced portion 2 at its lower end removably engaging around a cup 3, secured centrally in a boiler-pan 4. The bottom of the cup 3 extends below the bottom of the pan 4 and is designed to engage in the stove-hole of a stove. The cup 3 is provided with perforations 5, through which water may enter from the pan 4.

Arranged within the body portion 1 and on a plane above the top of the pan 4 is a perforated bottom 6, which preferably is removable, and just above the central portion of the body 1 is a tray 7, having a perforated bottom, and this tray is removably supported on lugs 8, extended inward from the body portion. The body portion 1 is provided with a removable cover 9, and preferably I employ a supplemental cover 10, which when in place extends over the cover 9 and has its side wall extended a considerable distance down the body portion 1. This supplemental cover forms a jacket which has a tendency to protect the body portion from contact with the outer atmosphere, which would lower the temperature of the steam within the vessel, and will also conduct any escaping and condensed steam back to the pan.

A steam-pipe 11 extends upward from the bottom of the cup 3 through the perforated bottom 6, and to the upper end of this steampipe 11 branch pipes 12 are removably attached. These branch pipes 12 extend upward through openings in the bottom of the tray 7 and nearly to the top of the body portion 1. The lower end of the steam-pipe 11 is somewhat enlarged and is provided with perforations 13, through which water from the cup 3 may enter.

In operation the cans containing the fruit are placed in the body portion upon the perforated bottom 6, and then after placing the tray 7 in place another set of cans containing fruit is placed thereon, and then after pouring a sufficient quantity of water into the pan 4 the device is placed on the stove. A portion of the steam generated will pass through the perforations in the bottom 6 and steam the fruit in this section of the body portion, and a portion of the steam will pass upward through the pipes 11 and 12 into the upper section and steam the fruit therein.

It will be seen that by the use of the steampipes the upper section will maintain an equal heat to that of the lower section, or, in other words, the fruit in each section will be equally cooked. By making the several parts detachable one from another it is obvious that the device may be easily cleaned. The steamer may be made in any desired size either for household or factory use.

Having thus described my invention, I claim as new and desire to secure by Letters Patent—

1. A fruit-canner, comprising a body portion, a pan in which said body portion is removably supported, a perforated bottom in the lower portion of said body, the said perforated bottom being above the plane of the pan, a tray supported in said body portion and having a perforated bottom, and a steam-pipe extended from the lower portion of the pan through said tray, substantially as specified.

2. A fruit-canner, comprising a body portion, a pan, a cup secured in said pan and supporting the body portion, a perforated bottom in the body portion, a removable tray in said body portion having a perforated bottom, a steam-pipe resting on the bottom of the said cup and extended upward through the tray, and a cover for the body portion, substantially as specified.

3. A fruit-canner, comprising a pan, a cup in said pan, having perforations providing communication between the pan and the interior of the cup, a body portion having a reduced lower end removably engaging with said cup, a removable perforated bottom in said body portion, a tray removably supported in the body portion and having a perforated bottom, a steam-pipe extended from the cup and having perforations at the lower end, branch pipes removably attached to the upper end of said steam-pipe and extended through the bottom of the tray, a cover for the body portion, and an auxiliary cover having its side wall extended downward approximately to the center of the body portion, substantially as specified.

ANNA C. McCUTCHEON.

Witnesses:
ELSIE MEKEEL,
MAE E. WARREN.